United States Patent Office.

FRANKLIN R. TAYLOR, OF WAVERLY, NEW YORK.

Letters Patent No. 114,223, dated April 25, 1871.

IMPROVEMENT IN HAIR-DRESSINGS.

The Schedule referred to in these Letters Patent and making part of the same.

*To all whom it may concern:*

Be it known that I, FRANKLIN R. TAYLOR, of Waverly, in the county of Tioga and State of New York, have invented a new and valuable Improvement in Fluid Dressing for the Hair; and I do hereby declare that the following is a full, clear, and exact description of the composition and proportions of the same.

My invention has relation to compounds for promoting the growth of and beautifying the hair, and consists in compounding and mixing together the ingredients in the proportions hereinafter mentioned.

The ingredients and proportions are as follows:

Castor-oil, one pint; spirits of wine, three quarts; aqua ammonia, two ounces; glycerine, four ounces; camphor-gum, one-half ounce; tincture of cantharides, two ounces; common salt, one and one-half ounce; oil of bergamot, one half ounce; oil of cinnamon, one-quarter ounce; oil of citronella, one-quarter ounce; tincture of red aniline, one-half ounce—in all, three quarts, one pint, eleven and one-half ounces.

The process of compounding is as follows:

I heat the castor-oil and glycerine and mix thoroughly together. I then dissolve the camphor-gum in the spirits of wine, and then add all the common salt (chloride of sodium) it will dissolve, which, in the quantity named above, will be about one and one-half ounce. I then add the mixed oils to the spirits and shake and mix thoroughly. I next add the aqua ammonia and tincture of cantharides and again shake well.

I let the compounds thus mixed remain quiet for about twenty minutes, and then strain and add the perfumery and coloring substances in the proportions above mentioned.

I finally shake the entire mixture thoroughly until the compounds become thoroughly mixed, when the mixture is ready for bottling.

The properties of the ingredients, and the manner and proportions in which they are compounded, render this mixture a beautiful, healthful, and cheap preparation for promoting the growth of the hair and beautifying the same.

Having thus fully described my invention,

What I claim as new, and desire to secure by Letters Patent, is—

The compound herein described, compounded in the manner and proportions and for the purpose herein set forth.

In testimony that I claim the above I have hereunto subscribed my name in the presence of two witnesses.

F. R. TAYLOR.

Witnesses:
FRANK TOZER,
J. NEWTON DEXTER.